Figure 1:
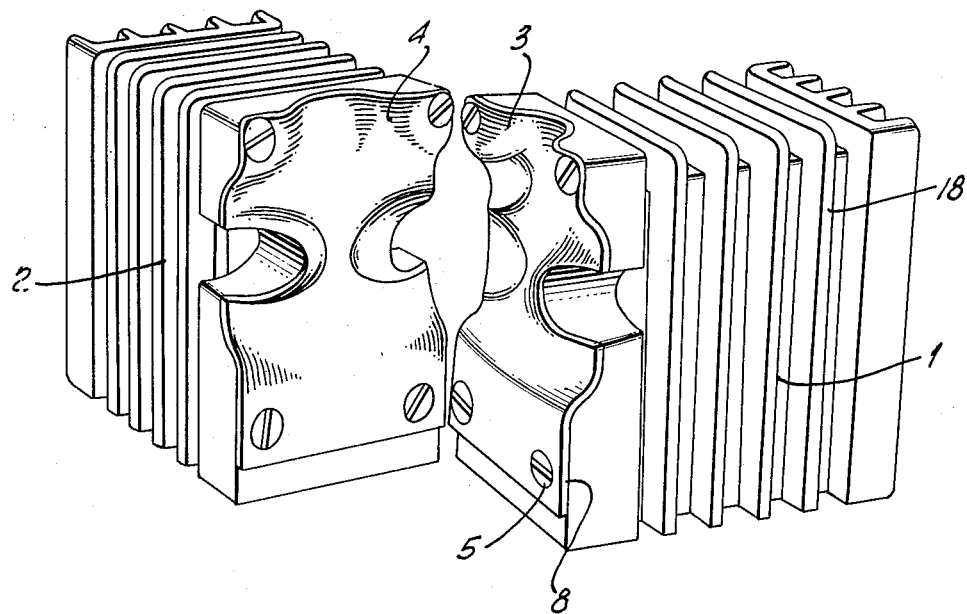

Jan. 2, 1962    A. D. PELKEY    3,015,716
MOLD FOR USE IN WELDING CHAIN LINKS
Filed Aug. 6, 1959    3 Sheets-Sheet 1

INVENTOR:
ARTHUR D. PELKEY
BY
Max D. Farmer
ATTORNEYS.

Jan. 2, 1962 A. D. PELKEY 3,015,716
MOLD FOR USE IN WELDING CHAIN LINKS
Filed Aug. 6, 1959 3 Sheets-Sheet 2

INVENTOR.
ARTHUR D. PELKEY
BY
Max H. Farmer
ATTORNEYS.

United States Patent Office 3,015,716
Patented Jan. 2, 1962

3,015,716
MOLD FOR USE IN WELDING CHAIN LINKS
Arthur D. Pelkey, 32 Joy Road, Peabody, Mass.
Filed Aug. 6, 1959, Ser. No. 832,124
10 Claims. (Cl. 219—130)
(Granted under Title 35, U.S. Code (1952) sec. 266)

The invention described herein may be manufactured and used by or for the Government of the United States of America for governmental purposes without the payment of any royalties thereon or therefor.

This invention relates to wrought metal chain links of the stud type such as are used in chains for mooring ships and buoys and the like and more particularly to an improved mold for the manufacture and completion of such links.

Several methods of making chain stud links have been employed in the past with various degrees of success. An improved method of manufacturing chain stud links has been fully described in U.S. Patent No. 2,822,663, granted on February 11, 1958. The method disclosed in that patent of fabricating an improved chain stud link essentially involves starting with a section of bar stock and bending it back on itself with the bar ends in alignment and facing one another. A space is left between these free bar ends after bending, and on an inner portion of the bar opposite this space a welding operation is performed whereby a stud is built up from this inner portion of the bar opposite said space, toward the space and continued until the space is filled, so that a stud and closure are formed in one single operation. This method of fabrication offers several advantages. The cost of manufacture is low because the entire stud and closure formation requires only one welding operation and furthermore since the stud and closure are part of one integral weld, the strongest possible form of union between the welded portion and the incomplete link exists, resulting in a superior chain link. Further, since the welding operation is commenced on a solid portion of the link, a complete cross-sectional fusion weld is made and the closure itself is strengthened because the bar ends are preheated during the formation of the stud.

In order, however, to practice the method of that patent (No. 2,822,663) to best advantage, two completed links having cross studs and closures are engaged to each end of an incomplete link which is to be completed by welding, and this triplet must then be mounted or securely held in position during welding in order to form a continuous solid weld. Previous methods employing clamping devices and solid metallic molds for positioning of the chain triplet have proven unsatisfactory due to the fact that the heat produced during the welding operation could not be dissipated at the proper rate. This is particularly true where the heat dissipation from the weld is great and the weld is cooled too rapidly for the formation of small grain structure in the weld. Where the cooling is too slow, the mold or clamp will adhere to the weld or melt during the welding operation.

This invention relates to an improved mold design for use in the fabrication of chain stud links by the above described method, or any method where controlled weld cooling is necessary.

An object of the present invention is to provide an improved mold for welding chain links.

Another object is to provide an improved mold which will assure optimum welding conditions and proper heat dissipation.

A further object is to provide a simple, efficient, practical, effective and inexpensive welding chain mold.

Other objects and advantages will be apparent from the following description of an embodiment of the invention and the novel features thereof will be particularly pointed out hereinafter in connection with the appended claims.

Figure 2:
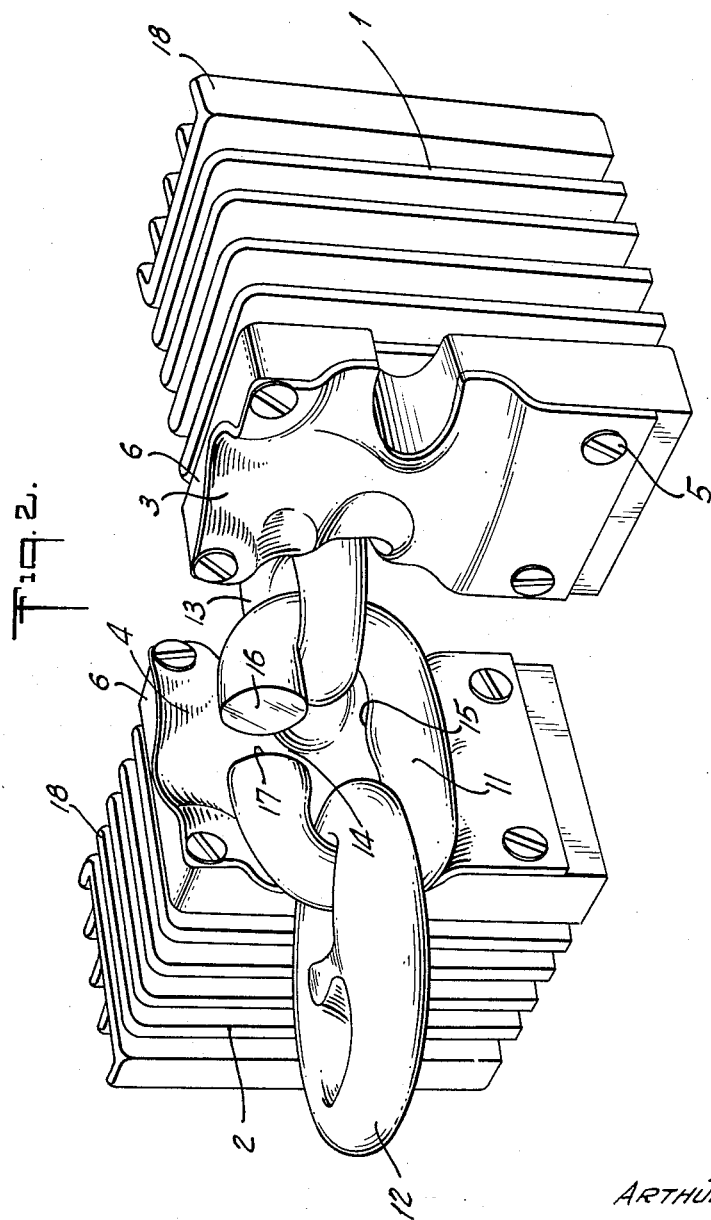

In the accompanying drawings:
FIG. 1 is a perspective drawing illustrating the separate mold sections embodying this invention;
FIG. 2 is a perspective drawing illustrating the relative position of the chain links before full assembly of the mold; and
FIG. 3 is also a perspective drawing of the assembled mold with the chain links inserted preparatory to the final welding.

Figure 3:
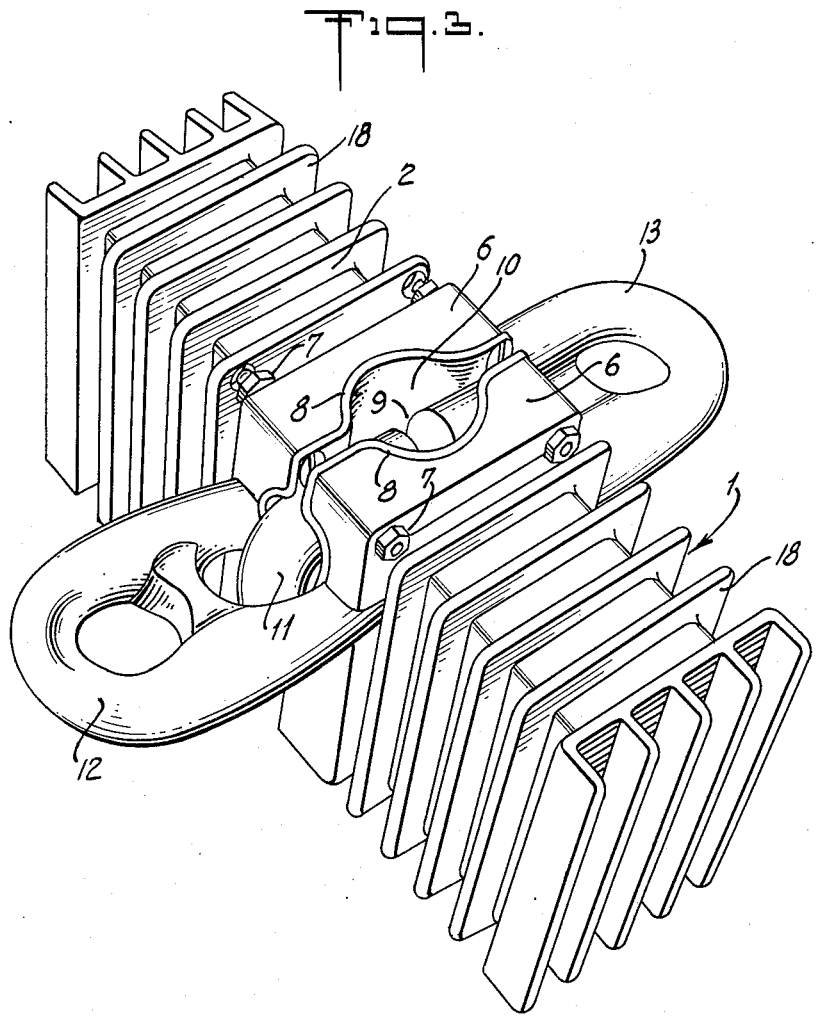

In the embodiment of the invention illustrated in FIGS. 1 through 3, the chain mold, comprises two similar box-like mold sections 1 and 2 which may be constructed of any good heat conducting metal. Each mold section may be solid throughout or be fabricated with a recess extending from or opening into an end of the mold. It has been found that using a cast aluminum solid mold body section construction provides entirely satisfactory results, simplifies construction and lowers the cost of the mold. Where solid mold sections are employed as illustrated, the open end of each mold is entirely closed by a relatively thin metallic insert or lining 3 and 4, preferably a good conductor of heat such as copper, each of which is detachably secured to the mold section face by screws 5 that are countersunk in the exposed face of the linings 3 and 4 and extend and may be threaded into a solid edge portion of the mold or as illustrated in FIG. 3 may extend through the facing portion 6 of the mold and secured there by bolt 7. Dense sheet copper is preferred to cast copper for the linings, since it exhibits superior heat conduction properties and is relatively easily fabricated. The interior face area of the lining and the edges of the mold at the open or lined end have complementary depressions in their abutting faces whereby when the mold sections are assembled as in FIG. 3 and face each other with their respective lining abutting in a face to face relationship, a space 9 is created therebetween with a passage outwardly therefrom which terminates in an opening 10 in a side of the assembled mold. The space so formed is of a shape and size as to receive, conform to, and hold therein an open or incomplete chain link 11 and two complete stud links 12 and 13 engaged with each end of the incomplete link, or if it is desired, only the incomplete chain link. The relative position of the incomplete link in the mold is such that the gap 14 of the incomplete link is disposed adjacent to the passage opening 10 and this opening between the molds extends as a passage in a direction through the link gap to the opposite inwardly facing bar portion 15 of the incomplete link.

In order to more fully describe this invention, it is desirable to explain a link completion or welding operation employing the embodiment of this invention illustrated in FIGS. 1 through 3. A section of bar stock of the proper length is heated and bent by suitable apparatus into an incomplete chain link 11 leaving a gap 14 approximately equal in length between the bar ends 16 and 17 to the diameter of the bar stock at the gap. After passing the ends of the incomplete link at the gap through the ends of two completed links, which may have been previously completed utilizing the improved mold of this invention, or by any other suitable means, the three links or the chain triplet is placed as shown in FIG. 2 in the cavity formed by the complementary depressions in the abutting linings 3 and 4.

Although it is not necessary to use completed links in the mold as above, their use will simplify and lower the cost of operation since they may be unitarily fabricated. With the chain triplet in position in the cavity provided in one of the recessed portions of the mold lining which is formed to receive the links, the opposing or mating mold 1 is brought into face to face abutting relationship with the first mold 2 which had previously received the triplet. The recesses in the linings 3 and 4 form a channel or space which confines the chain triplet when the linings are in a face to face abutting relationship. The molds may be secured together in this relation by any suitable clamping means (not shown) as for instance by simple C clamps which have been found to perform satisfactorily. The incomplete link to be welded is maintained in a vertical position so that the link stud to be formed can be built up in a direction such that gravity will maintain the weld material within the passage formed between the molds. The arc welding operation is now commenced by inserting a welding rod into the opening 10 past the gap 9 between the ends of the incomplete link and striking an arc between the end of the welding rod and the inner bar portion 15 of the link opposite the gap. A stud deposit is now slowly built up in an upward direction toward the gap, then into and finally filling the gap by a weld closure. The stud and closure weld fabricated in this manner is strong, solid, reliable and smooth.

During the welding process the linings 3 and 4 which should be constructed of good metallic heat conductors such as dense sheet copper are of sufficient thickness so as not to be consumed by the heat generated during welding, and to conduct the heat thusly generated away into the mold sections where it may be dissipated by radiation into the surrounding atmosphere. The lining material preferably should be a better heat conductor than the mold section material, and a sufficient good heat conductor to transfer the heat created therein by the welding to the mold sections before the lining is softened or melted. It should be borne in mind, however, that a too rapid loss of heat through the lining will result in a poor weld grain structure. In order to control the rate of loss of heat from the weld through the lining and thereby effect a satisfactory weld, several alternative methods can be employed. For example, the size and shape of the mold sections as to the exposed heat radiating surface areas thereof my be selected to dissipate the heat at the desired rate. Also, radiating fine 18 may be provided on the exposed surfaces of the mold sections to increase the rate of heat dissipation. Also, the particular metal itself used for the mold sections, such as copper, aluminum or iron, for example, can be selected to vary or provide a desired rate of heat dissipation. One may also vary and select the area of contact between the lining and the mold section to which it is connected to give a desired rate of heat flow away from the welding arc.

Superior weld results have been attained where a dense sheet copper was used for the lining, closing the open end of a solid cast aluminum mold section having radiating fins on all its exposed surfaces. Though other materials, various mold sizes and shapes can render similar results, the case of fabrication of the lining and mold section, the relative compactness and the fact that the inserts or linings are readily replaceable, dictates the use of the mold construction described above. Sheet copper linings or inserts approximately 1/8 inch thick when used with a solid cast aluminum mold section were still usable after a minimum of 100 welds, and this selected thickness has been found very practical as to durability, cost, and efficient and economical operations.

The present invention provides several advantages over the prior art in that the replaceable dense copper lining or insert in conjunction with the air-cooled cast aluminum mold properly controls the rate of heat dissipation from the weld, thereby lengthening the usable life of the insert and mold, reducing the welding current necessary to weld successfully and efficiently and to produce a superior weld structure and chain link.

It will be understood that various changes in the details, materials and arrangement of parts, which have been herein described and illustrated in order to explain the nature of this invention, may be made by those skilled in the art within the principle and scope of the invention as expressed in the appended claims.

I claim:

1. A device for use in forming a chain which comprises a mold formed of separable metallic sections which abut face to face, the abutting faces of said mold sections being lined with good heat conducting metal in relatively thin form and having between the linings when the sections are assembled a space with a passage therefrom terminating in an opening in a side of the mold, and which space is of a shape and size to receive and hold an incomplete chain link having a gap in one side thereof with the gap adjacent said opening in the side of the mold and a complete link engaged with each end of the incomplete link, whereby a welding electrode may be inserted through said passage for contact with said incomplete link to deposit a filling for closing the gap in said incomplete link, said mold sections having exposed cooling surface area for cooling them and said lining metal.

2. A mold for use in arc welding chain links comprising a pair of metallic jackets each having one end open and an external cooling surface area, a relatively thin plate detachably fixed to and closing the open end of each of said jackets for continuous conduction of heat through said plate, said jackets having between their abutting faces a space to receive and hold between them a link to be completed when said jackets are assembled with said thin plates in abutting, aligned face to face relationship, said abutting faces of said plates having between them a passage opening through a side of the assembled jackets and plates through which an electrode of an electric welding device may be inserted to build up and complete a link confined in said space.

3. The device according to claim 1, wherein said lining metal is of relatively denser sheet copper than cast copper.

4. The device according to claim 1, wherein said mold sections have recesses in their abutting faces which are closed by said thin lining metal.

5. The device according to claim 1, wherein said mold sections have cavities therein which open solely through said abutting faces and are closed by said thin metal lining.

6. The device according to claim 5, wherein said thin metal linings are of relatively denser metal than cast metal of the same kind.

7. The device according to claim 1, and means for selectively and releasably confining said mold sections together.

8. The device according to claim 1, wherein said linings are selectively detachable from the mold sections for ready replacement.

9. The device according to claim 1, wherein said mold sections are of metallic aluminum and said linings are of copper sheets that are denser than cast copper.

10. The device according to claim 1, wherein said external cooling surface comprises a plurality of exposed heat radiating fins.

References Cited in the file of this patent

UNITED STATES PATENTS

| | | |
|---|---|---|
| 1,599,423 | Lee | Sept. 14, 1926 |
| 1,910,015 | Homand | May 23, 1933 |
| 2,300,034 | McWane | Oct. 27, 1942 |
| 2,348,087 | Miller | May 2, 1944 |
| 2,822,663 | Lutts | Feb. 11, 1958 |

FOREIGN PATENTS

| | | |
|---|---|---|
| 428,615 | Great Britain | May 16, 1935 |
| 564,231 | Great Britain | Sept. 19, 1944 |